United States Patent
Song

(10) Patent No.: US 11,726,292 B2
(45) Date of Patent: Aug. 15, 2023

(54) OPTICAL SYSTEM

(71) Applicant: TDK TAIWAN CORP., Taoyuan (TW)

(72) Inventor: Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 98 days.

(21) Appl. No.: 17/239,242

(22) Filed: Apr. 23, 2021

(65) Prior Publication Data

US 2021/0239884 A1    Aug. 5, 2021

Related U.S. Application Data

(63) Continuation of application No. 16/257,355, filed on Jan. 25, 2019, now Pat. No. 11,029,452.

(Continued)

(51) Int. Cl.
*G02B 7/02*     (2021.01)
*G02B 7/08*     (2021.01)
(Continued)

(52) U.S. Cl.
CPC .............. *G02B 7/023* (2013.01); *F03G 7/065* (2013.01); *F03G 7/0614* (2021.08); *G02B 3/12* (2013.01);
(Continued)

(58) Field of Classification Search
CPC ... F03G 7/065; G02B 13/004; G02B 13/0065; G02B 13/0075; G02B 13/009; G02B 26/004; G02B 26/0816; G02B 26/0883; G02B 27/0068; G02B 27/0955; G02B 27/0972; G02B 27/0977; G02B 27/646; G02B 3/14; G02B 5/003; G02B 6/0025; G02B 6/0066; G02B 7/023; G02B 7/08; G02B 7/09; G02B 7/102; G02B 7/1805; G02B 7/182; G02B 7/1821; G02B 7/1828;
(Continued)

(56) References Cited

U.S. PATENT DOCUMENTS 6,079,875 A * 6/2000 Klass ..................... G01K 11/32
374/161
10,717,412 B2 * 7/2020 Abel Rayan .......... H04W 12/68
(Continued)

FOREIGN PATENT DOCUMENTS

CN    102194328 A    9/2011
CN    109961501 A    7/2019

OTHER PUBLICATIONS

Office Action (with Search Report) issued in corresponding CN Application No. 201910074429.8 dated May 21, 2021 (9 pages).

*Primary Examiner* — Bobbak Safaipour
(74) *Attorney, Agent, or Firm* — Muncy, Geissler, Olds & Lowe, P.C.

(57) ABSTRACT

A 3D object information capturing system is provided, including a camera module, a distance measuring module, and a processing module. The camera module captures image information of an object, and the distance measuring module captures distance information of the object. The processing module receives the image information and the distance information respectively from the camera module and the distance measuring module, and constructs a 3D model of the object according to the image information and the distance information.

20 Claims, 8 Drawing Sheets

Related U.S. Application Data

(60) Provisional application No. 62/785,593, filed on Dec. 27, 2018, provisional application No. 62/782,664, filed on Dec. 20, 2018, provisional application No. 62/780,077, filed on Dec. 14, 2018, provisional application No. 62/760,320, filed on Nov. 13, 2018, provisional application No. 62/753,716, filed on Oct. 31, 2018, provisional application No. 62/711,036, filed on Jul. 27, 2018, provisional application No. 62/703,147, filed on Jul. 25, 2018, provisional application No. 62/688,694, filed on Jun. 22, 2018, provisional application No. 62/682,671, filed on Jun. 8, 2018, provisional application No. 62/625,600, filed on Feb. 2, 2018, provisional application No. 62/621,967, filed on Jan. 25, 2018.

(51) Int. Cl.

| | | |
|---|---|---|
| *G02B 27/64* | (2006.01) | |
| *G03B 9/14* | (2021.01) | |
| *G02B 13/00* | (2006.01) | |
| *G02B 7/182* | (2021.01) | |
| *F03G 7/06* | (2006.01) | |
| *G02B 3/12* | (2006.01) | |
| *H04N 23/45* | (2023.01) | |
| *H04N 23/51* | (2023.01) | |
| *H04N 23/54* | (2023.01) | |
| *H04N 23/55* | (2023.01) | |
| *H04N 23/56* | (2023.01) | |
| *H04N 23/57* | (2023.01) | |
| *H04N 23/73* | (2023.01) | |
| *G03B 9/06* | (2021.01) | |
| *G02B 7/09* | (2021.01) | |
| *G03B 5/00* | (2021.01) | |
| *G03B 13/36* | (2021.01) | |
| *H02K 41/035* | (2006.01) | |
| *G02B 7/10* | (2021.01) | |
| *G06F 1/16* | (2006.01) | |
| *G02B 3/14* | (2006.01) | |
| *G02B 26/00* | (2006.01) | |
| *G02B 27/00* | (2006.01) | |
| *G02B 26/08* | (2006.01) | |
| *G03B 17/17* | (2021.01) | |
| *F21V 8/00* | (2006.01) | |
| *G02B 27/09* | (2006.01) | |
| *G09G 5/00* | (2006.01) | |
| *G02B 7/18* | (2021.01) | |
| *G06T 7/521* | (2017.01) | |
| *G06T 7/00* | (2017.01) | |
| *G06T 15/08* | (2011.01) | |
| *G03B 5/04* | (2021.01) | |
| *G02B 5/00* | (2006.01) | |

(52) U.S. Cl.
CPC ............ *G02B 3/14* (2013.01); *G02B 6/0025* (2013.01); *G02B 6/0066* (2013.01); *G02B 7/08* (2013.01); *G02B 7/09* (2013.01); *G02B 7/102* (2013.01); *G02B 7/182* (2013.01); *G02B 7/1805* (2013.01); *G02B 7/1821* (2013.01); *G02B 13/009* (2013.01); *G02B 13/0065* (2013.01); *G02B 13/0075* (2013.01); *G02B 26/004* (2013.01); *G02B 26/0816* (2013.01); *G02B 26/0883* (2013.01); *G02B 27/0068* (2013.01); *G02B 27/0955* (2013.01); *G02B 27/0972* (2013.01); *G02B 27/0977* (2013.01); *G02B 27/646* (2013.01); *G03B 5/00* (2013.01); *G03B 9/06* (2013.01); *G03B 9/14* (2013.01); *G03B 13/36* (2013.01); *G03B 17/17* (2013.01); *G06F 1/1686* (2013.01); *G06T 7/521* (2017.01); *G06T 7/97* (2017.01); *G06T 15/08* (2013.01); *G09G 5/003* (2013.01); *H02K 41/0356* (2013.01); *H04N 23/45* (2023.01); *H04N 23/51* (2023.01); *H04N 23/54* (2023.01); *H04N 23/55* (2023.01); *H04N 23/56* (2023.01); *H04N 23/57* (2023.01); *H04N 23/73* (2023.01); *G02B 5/003* (2013.01); *G02B 13/004* (2013.01); *G03B 5/04* (2013.01); *G03B 2205/0007* (2013.01); *G03B 2205/0015* (2013.01); *G03B 2205/0069* (2013.01); *G06T 2207/10028* (2013.01); *G06T 2207/10048* (2013.01); *G09G 2354/00* (2013.01)

(58) Field of Classification Search
CPC .................. G03B 13/36; G03B 17/17; G03B 2205/0007; G03B 2205/0015; G03B 2205/0069; G03B 5/00; G03B 5/04; G03B 9/04; G03B 9/06; G03B 9/10; G03B 9/14; G06F 1/1626; G06F 1/1686; G06T 15/08; G06T 2207/10028; G06T 2207/10048; G06T 7/521; G06T 7/97; G09G 2354/00; G09G 5/003; H02K 41/0356; H04N 5/2252; H04N 5/2253; H04N 5/2254; H04N 5/2256; H04N 5/2257; H04N 5/2258; H04N 5/2353

See application file for complete search history.

(56) References Cited

U.S. PATENT DOCUMENTS

| | | | | |
|---|---|---|---|---|
| 10,761,403 | B2 * | 9/2020 | Wang | G02B 7/09 |
| 10,890,825 | B2 * | 1/2021 | Hu | G02B 13/009 |
| 10,914,870 | B2 * | 2/2021 | Yu | H04N 23/45 |
| 10,921,494 | B2 * | 2/2021 | Kao | H04N 23/57 |
| 10,928,559 | B2 * | 2/2021 | Wang | G02B 27/0972 |
| 10,935,701 | B2 * | 3/2021 | Kao | G06T 7/97 |
| 10,942,298 | B2 * | 3/2021 | Fu | G02B 26/0816 |
| 10,976,476 | B2 * | 4/2021 | Fan | G03B 13/36 |
| 11,002,891 | B2 * | 5/2021 | Kao | G03B 17/17 |
| 11,022,726 | B2 * | 6/2021 | Kuo | G06F 1/1686 |
| 11,029,452 | B2 * | 6/2021 | Song | G03B 17/17 |
| 11,029,453 | B2 * | 6/2021 | Hu | G02B 7/1821 |
| 11,086,050 | B2 * | 8/2021 | Hsu | G02B 7/1805 |
| 11,092,721 | B2 * | 8/2021 | Hu | H04N 23/73 |
| 11,105,962 | B2 * | 8/2021 | Song | G02B 27/646 |
| 11,125,920 | B2 * | 9/2021 | Fan | G03B 5/00 |
| 11,294,105 | B2 * | 4/2022 | Kao | H04N 23/45 |
| 11,397,304 | B2 * | 7/2022 | Kao | G03B 9/04 |
| 11,448,850 | B2 * | 9/2022 | Tsai | G02B 26/0816 |
| 11,508,332 | B2 * | 11/2022 | Li | G06F 3/041 |
| 2003/0179098 | A1 * | 9/2003 | Ghazarian | G08B 13/2497 |
| | | | | 340/686.6 |
| 2012/0213411 | A1 * | 8/2012 | Nozaki | G06T 5/009 |
| | | | | 382/103 |
| 2013/0288091 | A1 * | 10/2013 | Tsubaki | G01K 1/14 |
| | | | | 374/185 |
| 2014/0111154 | A1 * | 4/2014 | Roy | H01F 38/14 |
| | | | | 320/108 |
| 2015/0323694 | A1 * | 11/2015 | Roy | G01V 3/081 |
| | | | | 307/104 |
| 2018/0241923 | A1 * | 8/2018 | Lu | G06V 20/64 |
| 2019/0019046 | A1 * | 1/2019 | Zhou | G06F 18/22 |
| 2019/0197692 | A1 * | 6/2019 | Weistrand | G06T 7/174 |
| 2019/0227199 | A1 * | 7/2019 | Kao | G02B 7/1821 |
| 2019/0227200 | A1 * | 7/2019 | Kao | G02B 7/023 |
| 2019/0227201 | A1 * | 7/2019 | Kao | G06T 7/97 |
| 2019/0227253 | A1 * | 7/2019 | Fan | F03G 7/0614 |
| 2019/0227256 | A1 * | 7/2019 | Kuo | G09G 5/003 |
| 2019/0227257 | A1 * | 7/2019 | Song | G02B 27/0972 |

(56) References Cited

U.S. PATENT DOCUMENTS

| | | | |
|---|---|---|---|
| 2019/0227258 A1* | 7/2019 | Kao | H04N 23/54 |
| 2019/0227259 A1* | 7/2019 | Hsu | G02B 6/0066 |
| 2019/0227300 A1* | 7/2019 | Tsai | G02B 3/14 |
| 2019/0227330 A1* | 7/2019 | Hu | F03G 7/0614 |
| 2019/0227337 A1* | 7/2019 | Kuo | G02B 6/0066 |
| 2019/0227405 A1* | 7/2019 | Song | G02B 27/646 |
| 2019/0227406 A1* | 7/2019 | Wang | G02B 3/14 |
| 2019/0227408 A1* | 7/2019 | Fan | H04N 23/55 |
| 2019/0228562 A1* | 7/2019 | Song | G02B 27/0955 |
| 2019/0230255 A1* | 7/2019 | Fu | F03G 7/065 |
| 2019/0230256 A1* | 7/2019 | Kao | G09G 5/003 |
| 2019/0230257 A1* | 7/2019 | Hu | G03B 13/36 |
| 2019/0230261 A1* | 7/2019 | Hu | G02B 7/09 |
| 2019/0230262 A1* | 7/2019 | Wang | G02B 27/0977 |
| 2019/0258136 A1* | 8/2019 | Yu | G09G 5/003 |
| 2019/0280058 A1* | 9/2019 | Li | G06F 3/041 |
| 2020/0019794 A1* | 1/2020 | Engelcke | G06N 3/08 |
| 2020/0056945 A1* | 2/2020 | Stricker | G01K 1/143 |
| 2020/0160601 A1* | 5/2020 | Shreve | G06N 5/046 |
| 2020/0195831 A1* | 6/2020 | Muramatsu | B62D 15/021 |
| 2020/0269782 A1* | 8/2020 | Fujihira | H05K 7/026 |
| 2021/0096250 A1* | 4/2021 | Ogura | A61C 9/0073 |
| 2021/0239884 A1* | 8/2021 | Song | G02B 3/12 |
| 2021/0247551 A1* | 8/2021 | Kuo | G02B 26/004 |
| 2022/0171102 A1* | 6/2022 | Kao | G09G 5/003 |
| 2023/0009071 A1* | 1/2023 | Zhu | G05D 1/0246 |

* cited by examiner

OPTICAL SYSTEM

CROSS-REFERENCE TO RELATED APPLICATIONS

The present application is a continuation application of the U.S. patent application Ser. No. 16/257,355, filed on Jan. 25, 2019, which claims priority to U.S. Provisional Patent Application No. 62/621,967, filed on Jan. 25, 2018, No. 62/625,600, filed on Feb. 2, 2018, No. 62/682,671, filed on Jun. 8, 2018, No. 62/688,694, filed on Jun. 22, 2018, No. 62/703,147, filed on Jul. 25, 2018, No. 62/711,036, filed on Jul. 27, 2018, No. 62/753,716, filed on Oct. 31, 2018, No. 62/760,320, filed on Nov. 13, 2018, No. 62/780,077, filed on Dec. 14, 2018, No. 62/782,664, filed on Dec. 20, 2018, No. 62/785,593, filed on Dec. 27, 2018, which are incorporated by reference herein in their entirety.

BACKGROUND OF THE INVENTION

Field of the Disclosure

The present disclosure relates to an optical system, and more particularly to an optical system disposed in an electronic device.

Description of the Related Art

As the relevant technologies have developed, many electronic devices (such as cameras or smart phones) can record images and videos. However, when a lens having a long focal length is provided in the electronic device, the thickness thereof may be increased to adversely impede the prospects for miniaturization of the electronic device. Furthermore, conventional micro image capturing modules are mainly designed to have an aperture with a fixed size, and the image sharpness and photosensitivity of most small mobile electronic devices are not adjustable. A smaller aperture is required to achieve better image quality if the sensor supports and if there is enough light. However, if the size of the aperture is fixed and have a small size, image quality will be low when there is not enough light (e.g. at night). As a result, the image capturing ability under different environments will be sacrificed if the size of the aperture is fixed.

BRIEF SUMMARY OF INVENTION

An optical system is provided, including a fixed portion, a movable portion, an aperture unit and a first driving assembly. The movable portion is movably connected to the fixed portion and is used for holding an optical element. The aperture unit is disposed on the movable portion and is corresponding to the optical element. The first driving assembly is disposed in the fixed portion for moving the movable portion relative to the fixed portion.

In some optical systems of some embodiments of the present disclosure, the movable portion includes a frame and a holder, the frame is movably connected to the fixed portion, and the holder is movably connected to the frame for holding the optical element. The optical system further includes a second driving assembly disposed in the fixed portion to move the holder relative to the frame. The first driving assembly is used for moving the frame relative to the fixed portion, and the aperture unit is affixed to the holder. The aperture unit includes an aperture and a third driving assembly. The aperture includes an aperture opening, and the third driving assembly is connected to the aperture for continuously adjusting the size of the aperture opening.

The optical systems of some embodiments of the present disclosure further include a second driving assembly and a first resilient element. The second driving assembly is disposed in the fixed portion, the first driving assembly includes a first driving coil, the second driving assembly includes a second driving coil, and the aperture unit includes a driving magnetic element and a third driving coil. The third driving coil is disposed on the driving magnetic element, and the driving magnetic element corresponds to the first driving coil or the second driving coil. The frame is movably connected to the fixed portion through the first resilient element, and the third driving coil is electrically connected to the first resilient element.

In some optical systems of some embodiments of the present disclosure, the aperture unit includes a second resilient element, an aperture and a third driving coil disposed on the movable portion. The aperture includes an aperture opening, the second resilient element is used for directly or indirectly applying a predetermined pressure on the aperture, and the size of the aperture opening is predetermined size when no current is applied to the third driving coil. When current is applied to the third driving coil, the size of the aperture opening is different than the predetermined size. In some embodiments, when positive current is applied to the third driving coil, the size of the aperture opening is greater than the predetermined size; and when negative current is applied to the third driving coil, the size of the aperture opening is less than the predetermined size. In other embodiments, when negative current is applied to the third driving coil, the size of the aperture opening is greater than the predetermined size; and when positive current is applied to the third driving coil, the size of the aperture opening is less than the predetermined size. Furthermore, the optical system further includes another second resilient element, and the second resilient elements and the third driving coil are arranged in a first direction.

The optical systems of some embodiments of the present disclosure further include an image sensor and a size sensor. The image sensor is disposed on the fixed portion, and the size sensor is disposed in the fixed portion. The aperture unit includes an aperture having an aperture opening, and the size sensor is used for sensing the size of the aperture opening.

BRIEF DESCRIPTION OF DRAWINGS

The disclosure can be more fully understood by reading the subsequent detailed description and examples with references made to the accompanying drawings, wherein.

DETAILED DESCRIPTION OF INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
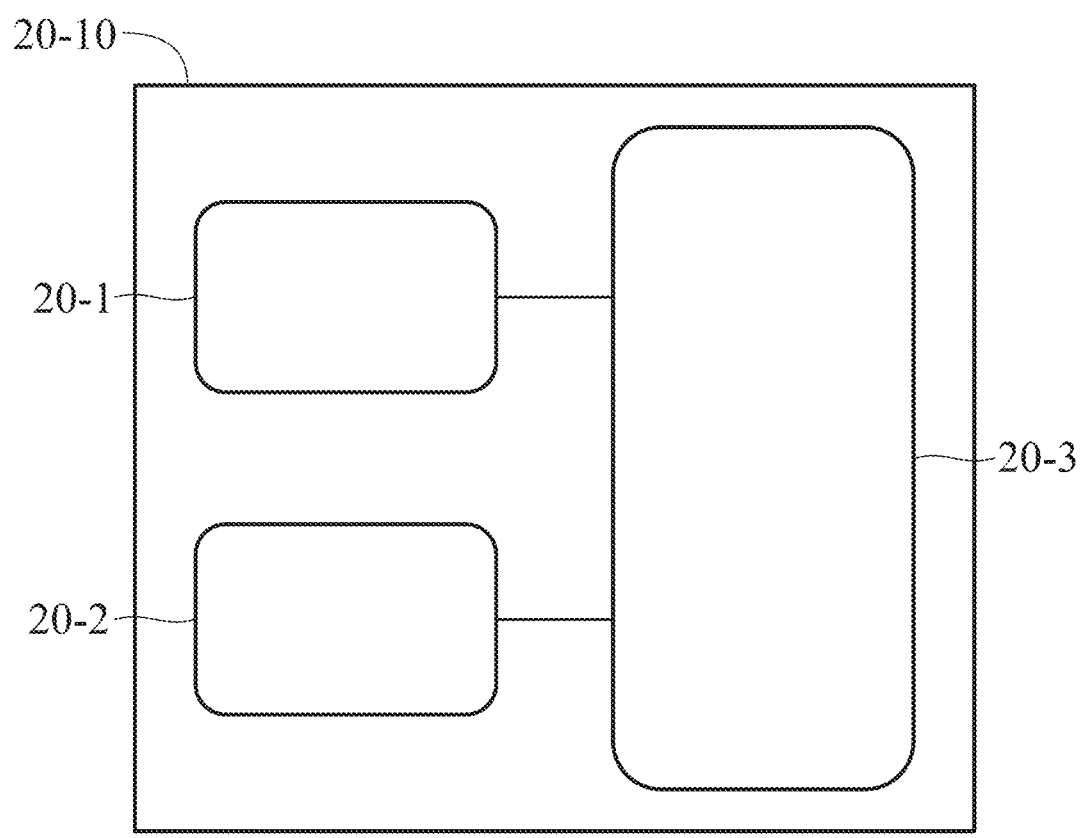
FIG. 1 is a schematic diagram showing a 3D object information capturing system in accordance with an embodiment of the application.

FIG. 1 is a schematic diagram showing a 3D object information capturing system in accordance with an embodiment of the application. The 3D object information capturing system 20-10 in FIG. 1 may be applied to vehicles, measuring equipment, cell phones, or moving object monitoring devices, which primarily comprises a camera module 20-1, a distance measuring module 20-2, and a processing unit 20-3.

The camera module 20-1 may have a camera lens for capturing image information of an object, and the distance measuring module 20-2 can capture distance information of the object's surface. The processing unit 20-3 can receive the image information and the distance information of the object respectively from the camera module 20-1 and the distance measuring module 20-2, so as to perform a 3D model construction of the object.

For example, the camera module 20-1 can capture a 2D image of the object, wherein the 2D image may be gray-level or color image that includes color information of the object. Subsequently, the camera module 20-1 transmits the 2D image to the processing unit 20-3, and the processing unit 20-3 can generate first outline information of the object by performing binarization on the 2D image.

During operation of the camera module 20-1, the distance measuring module 20-2 can perform distance measurement for the object and generate 2D distance matrix information of the object's surface. In some embodiments, the distance measuring module 20-2 can transmit infrared light and acquire 2D distance matrix information of the object's surface, and the 2D distance matrix information is then transmitted to the processing unit 20-3. Subsequently, the processing unit 20-3 can generate second outline information of the object by calculating the differences between adjacent elements of the 2D distance matrix information.

As a result, the processing unit 20-3 can establish a 3D model of the object based on the first outline information and the second outline information. For example, when the 3D object information capturing system 20-10 is applied to a moving object monitoring device, it can be used to calculate and analyze the traffic flow or amount of people by constructing 3D models of objects in a specific environment.

In some embodiments, the 3D object information capturing system 20-10 may be applied in measuring equipment for detecting and recording the size and texture of the objects, especially suitable for the fields of architecture and interior design.

In some embodiments, the 3D object information capturing system 20-10 may be applied in cell phones or camera devices to get a better quality of photography.

Additionally, the 3D object information capturing system 20-10 may also be applied in a vehicle, to rapidly construct 3D models of the objects around the vehicle. The 3D models can help the driver to have information about the surrounding environment and notice a potential hazard approaching.

In some embodiments, the 3D object information capturing system 20-10 can transmit the 3D models of the objects around the vehicle to a computing unit, and the computing unit can generate a moving path of the vehicle according to the 3D models of the objects. Thus, traffic accidents can be efficiently avoided, especially suitable for self-driving cars.

Figure 2:
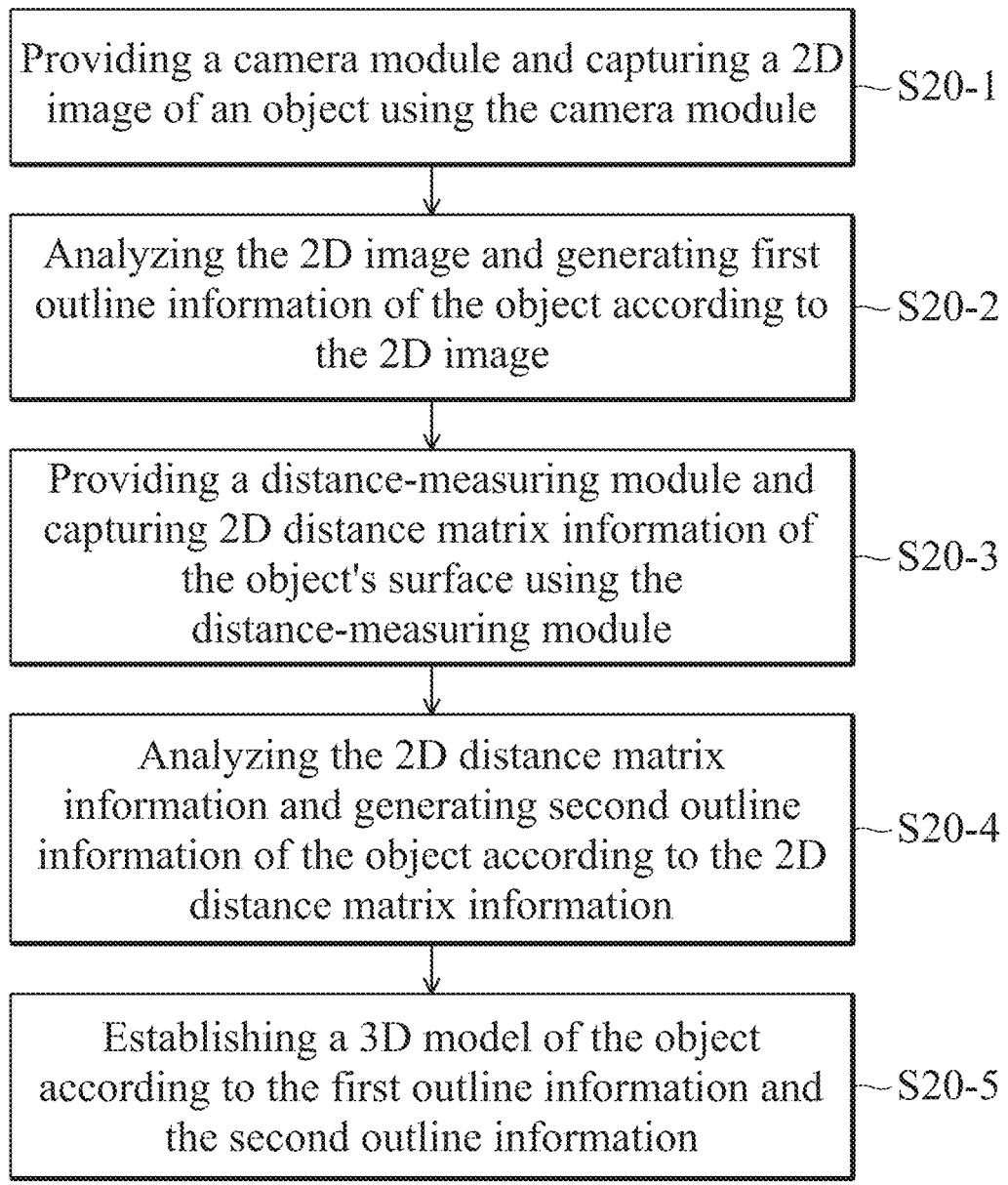
FIG. 2 is a schematic diagram showing a 3D object information capturing method in accordance with an embodiment of the application.

FIG. 2 is a schematic diagram showing a 3D object information capturing method in accordance with an embodiment of the application. Based on the 3D object information capturing system 20-10 disclosed in FIG. 1, the disclosure further provides a method for capturing 3D information of an object (FIG. 2). The method includes the step 20-S1 of providing a camera module 20-1 and capturing a 2D image of an object using the camera module 20-1. Subsequently, the camera module 20-1 transmit the 2D image to the processing unit 20-3, and the processing unit 20-3 analyzes the 2D image and generates first outline information of the object according to the 2D image (step 20-S2).

The method further includes the step 20-S3 of providing a distance-measuring module 20-2 and capturing 2D distance matrix information of the object's surface using the distance-measuring module 20-2. Subsequently, the distance-measuring module 20-2 can transmit the 2D distance matrix information to the processing unit 20-3, and the processing unit 20-3 analyzes the 2D distance matrix information and generates second outline information of the object according to the 2D distance matrix information (step 20-S4).

Finally, the processing unit 20-3 can establish a 3D model of the object according to the first outline information and the second outline information (step 20-S5).

Figure 3:
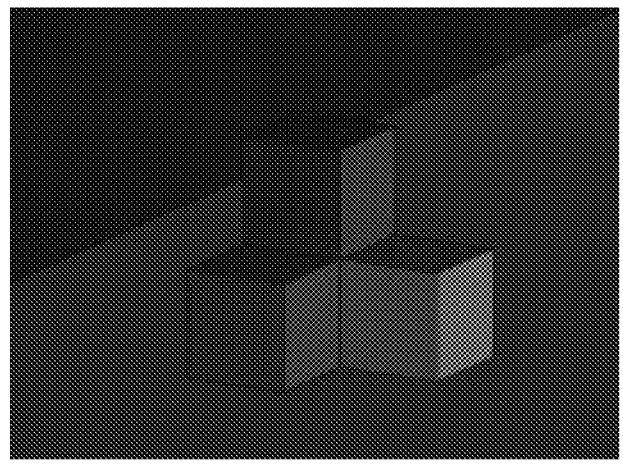
FIG. 3 is a schematic diagram showing the 2D image captured by the camera module 20-1 when the illumination by environmental light is weak.

It should be noticed that the 2D image and the 2D distance matrix information are respectively generated from the camera module 20-1 and the distance-measuring module 20-2, so that poor information quality of the object can be compensated to facilitate a precise 3D model of the object. For example, when the illumination by environmental light is weak (FIG. 3), the camera module 20-1 is hard to acquire a good gray-level or color image. In this circumstance, the 2D distance matrix information acquired by the distance-measuring module 20-2 can compensate for the gray-level or color image, to reduce the adverse influence of environmental light.

Figure 4:
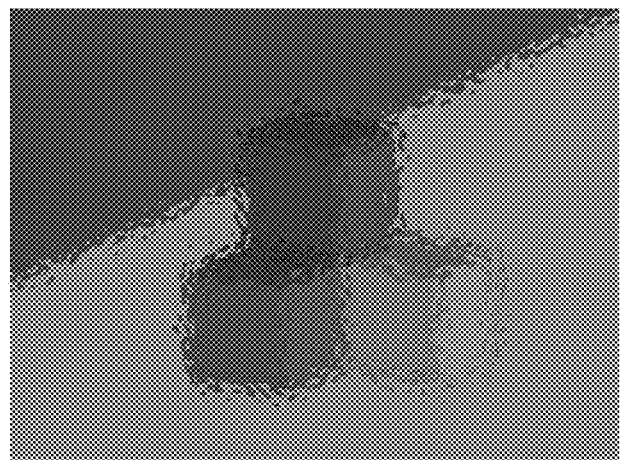
FIG. 4 is a schematic diagram showing the 2D distance matrix information captured by the camera module 20-1 when the illumination by environmental light is weak.

Alternatively, when the weather is rainy or foggy (FIG. 4), the distance-measuring module 20-2 is hard to acquire a good 2D distance matrix information of the object. In this circumstance, the gray-level or color image (including color, boundary, brightness information of the object) acquired by the camera module 20-1 can compensate for the 2D distance matrix information, to reduce the adverse influence of inclement weather conditions.

As described above, the disclosure can overcome the adverse influence of environmental light or inclement weather conditions by combining two different types of information which can compensate for each other. Hence, precise 3D models of the around objects can be established, suitable for the fields of vehicles, measuring equipment, consumer electronics, or moving object monitoring devices.

Figure 5:
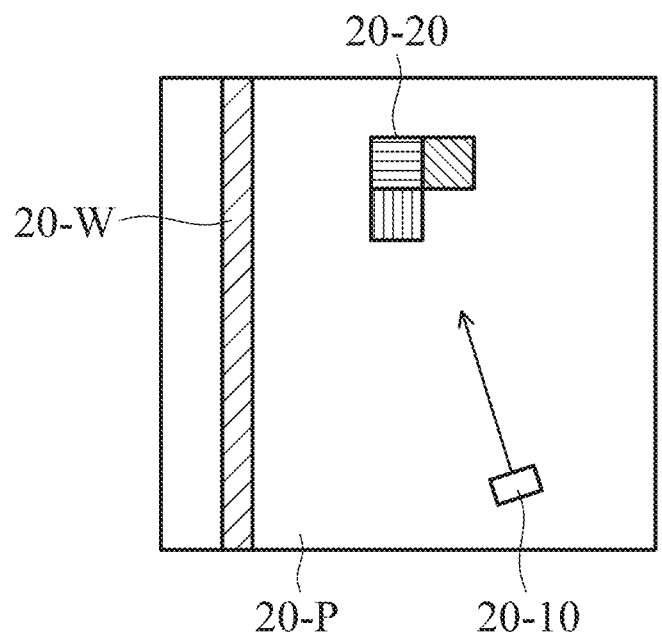
FIGS. 5, 6, and 7 are schematic diagrams showing a 3D object information capturing system 20-10 detecting an object 20-20 from different locations or angles, in accordance with an embodiment of the application.
Figure 6:
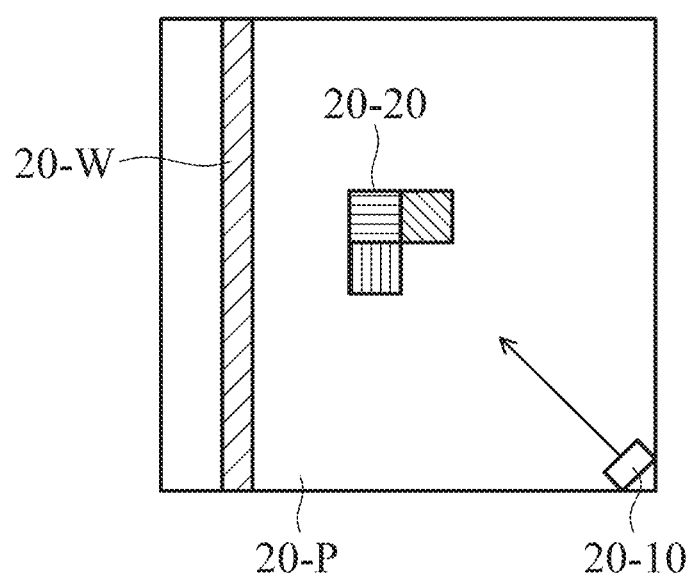
Figure 7:
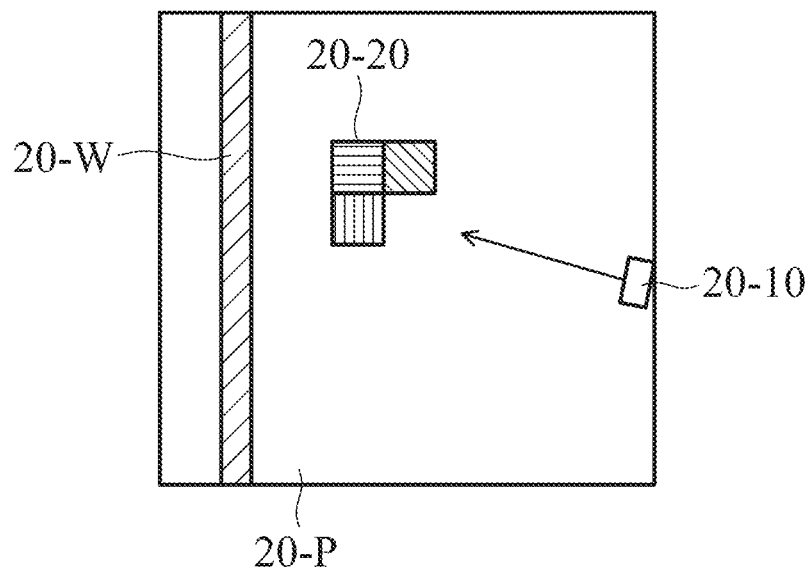
Figure 8:
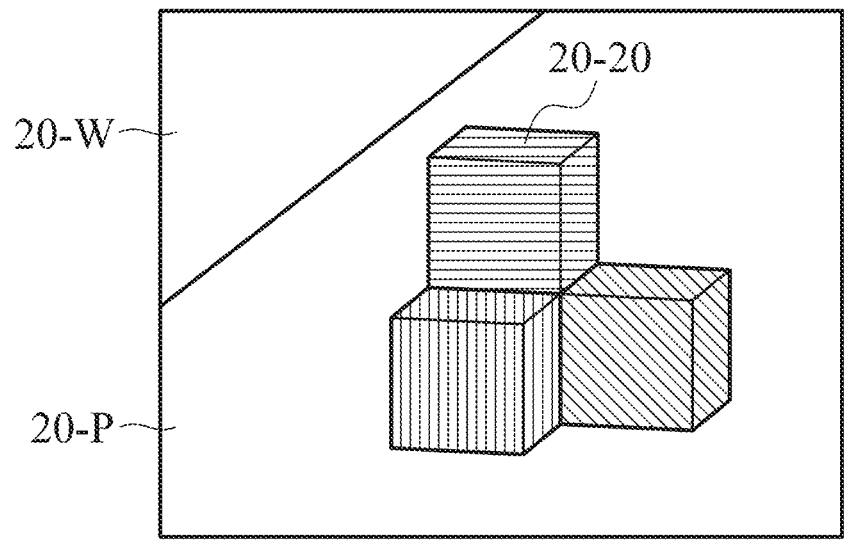
FIGS. 8, 9, and 10 are schematic diagrams showing the 2D images captured by the 3D object information capturing system 20-10 from different locations or angles as shown in FIGS. 5, 6, and 7.
Figure 9:
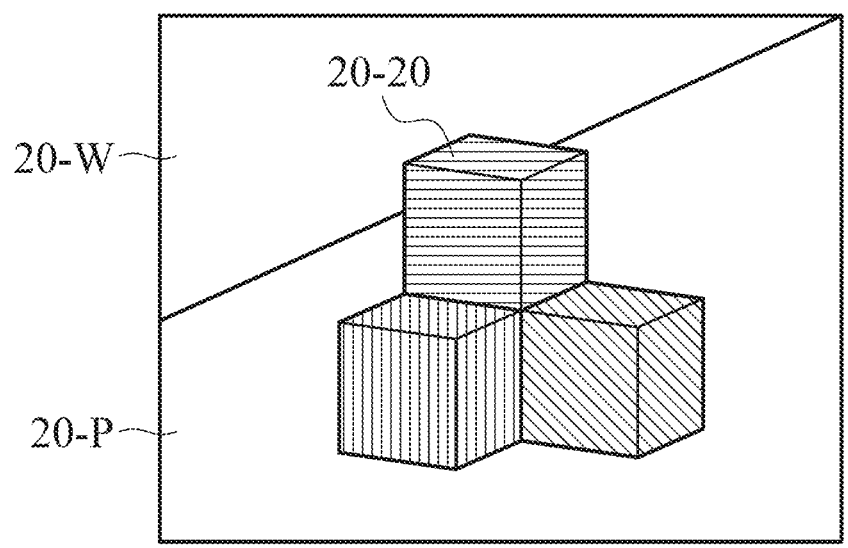
Figure 10:
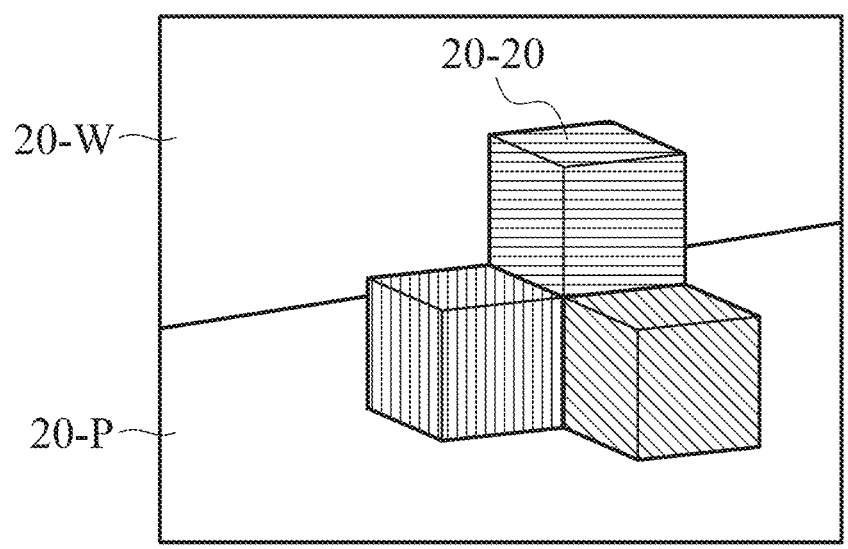

FIGS. 5, 6, and 7 are schematic diagrams showing a 3D object information capturing system 20-10 detecting an object 20-20 from different locations or angles, in accordance with an embodiment of the application. FIGS. 8, 9, and 10 are schematic diagrams showing the 2D images captured by the 3D object information capturing system 20-10 from different locations or angles as shown in FIGS. 5, 6, and 7.

In this embodiment, the 3D object information capturing system 20-10 can be moved with a car or other vehicles, whereby the camera module 20-1 can capture a plurality of 2D images of the object 20-20 on the ground 20-P from different locations or angles, as the 2D images show in FIGS. 8, 9, and 10.

Similarly, the distance-measuring module 20-2 can capture several 2D distance matrix information about the surface of the object 20-20 on the ground 20-P from different locations or angles by the same manner. Therefore, the processing unit 20-3 can receive the 2D images and the 2D distance matrix information respectively from the camera module 20-1 and the distance-measuring module 20-2, and establish a 3D model of the object 20-20 accordingly.

In some embodiments, the 3D object information capturing system 20-10 may be applied to a vehicle, and the 3D model of the object 20-20 can be constructed based on the 2D images and the 2D distance matrix information of the object 20-20. Here, the distance between the wall 20-W and the object 20-20 in the 3D space can be measured and provided to the driver. Additionally, the 3D object information capturing system 20-10 can further transmit 3D models of the objects in the surrounding environment to a computing unit of the vehicle, and the computing unit can generate a moving path of the vehicle accordingly to prevent from traffic accidents, especially suitable for self-driving vehicles.

Figure 11:
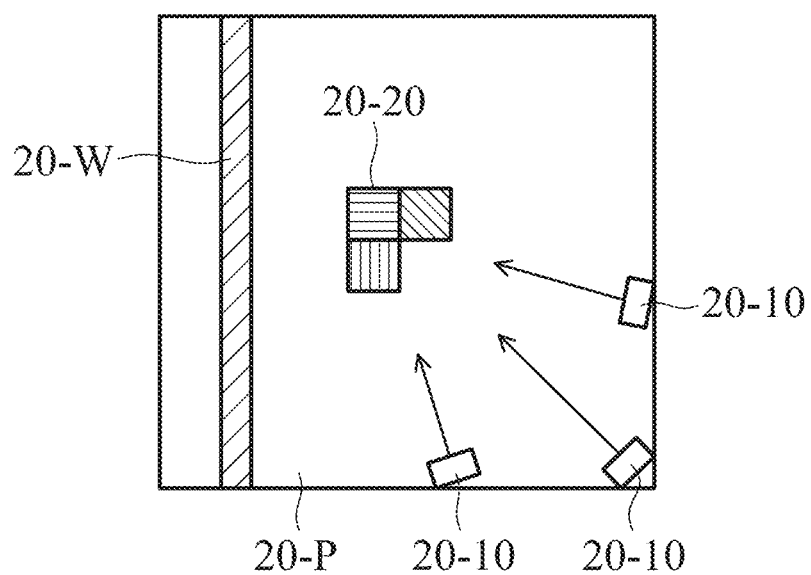
FIG. 11 is a schematic diagram showing a plurality of 3D object information capturing systems 20-10 detecting an object 20-20 on the ground 20-P from different locations or angles at the same time, in accordance with another embodiment of the application.

FIG. 11 is a schematic diagram showing a plurality of 3D object information capturing systems 20-10 detecting an object 20-20 on the ground 20-P from different locations or angles at the same time, in accordance with another embodiment of the application. In this embodiment, several 3D object information capturing systems 20-10 can be applied at the same time to detect object 20-20, so as to enhance the accuracy of 3D model construction. For example, the variation of the environment may also be detected and analyzed by video recording.

Figure 12:
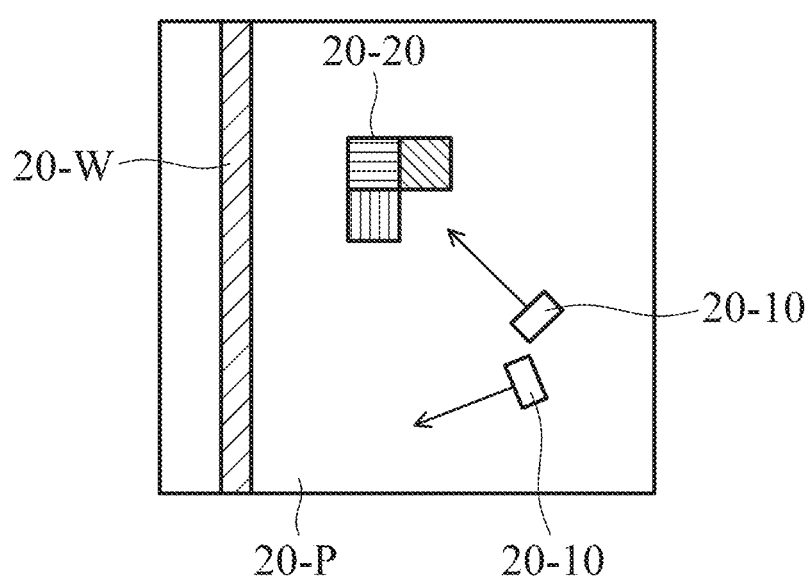
FIG. 12 is a schematic diagram showing a plurality of 3D object information capturing systems 20-10 facing different directions to detect the surrounding environment at the same time, in accordance with another embodiment of the application.

FIG. 12 is a schematic diagram showing a plurality of 3D object information capturing systems 20-10 facing different directions to detect the surrounding environment at the same time, in accordance with another embodiment of the application. In this embodiment, several 3D object information capturing systems 20-10 may be applied to a vehicle, and the 3D object information capturing systems 20-10 may be disposed on the front, lateral and bottom sides of the vehicle, so as to detect, record, and analyze different objects in the surrounding environment at the same time. Since these 3D object information capturing systems 20-10 can move with the vehicle, a great quantity of 2D data would be generated, so that a precise 3D model construction of the objects in the surrounding environment can be achieved.

Figure 13:
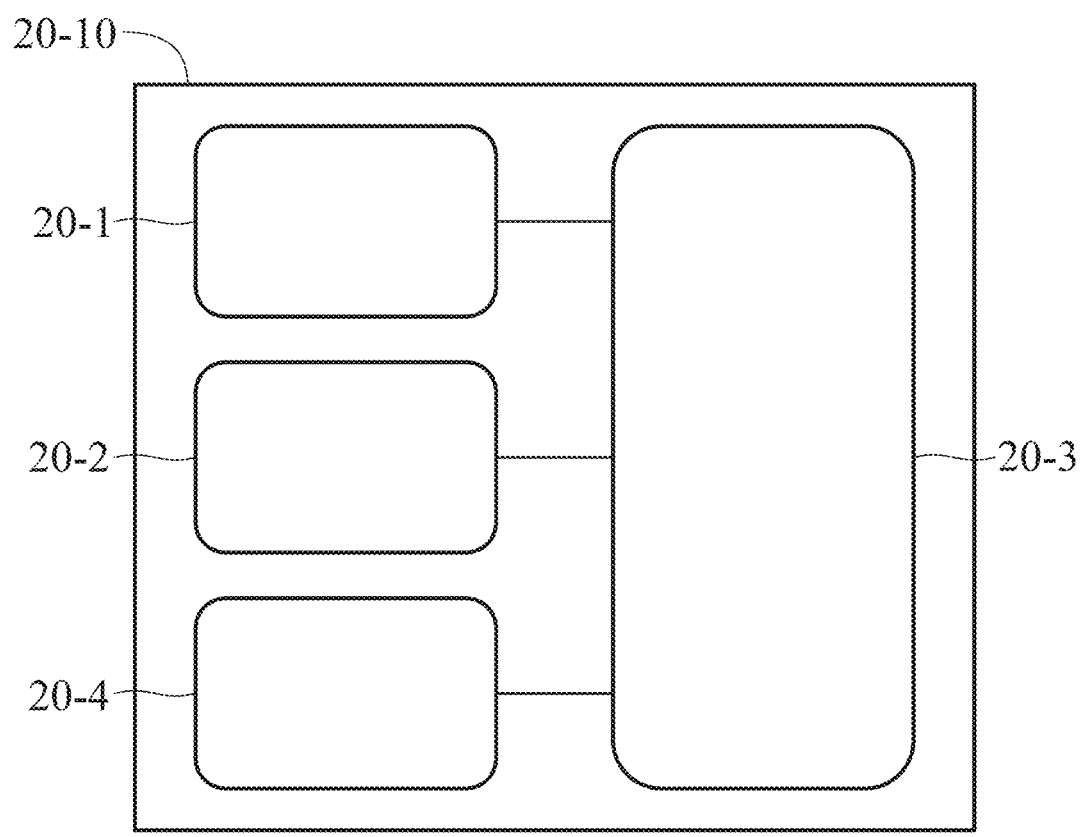
FIG. 13 is a schematic diagram showing a 3D object information capturing system 20-10 in accordance with another embodiment of the application.

FIG. 13 is a schematic diagram showing a 3D object information capturing system 20-10 in accordance with another embodiment of the application. The 3D object information capturing system 20-10 of FIG. 13 is different from FIG. 1 in that the 3D object information capturing system 20-10 further comprises a sensing unit 20-4 to acquire various useful information of the objects or the environment.

For example, the sensing unit 20-4 may comprise an infrared sensing module for sensing and obtaining an infrared image of the object. The sensing unit 20-4 can transmit the infrared image to the processing unit 20-3, and the processing unit 20-3 can analyze the infrared image and generate third outline information. Subsequently, the processing unit 20-3 can establish a 3D model of the object based on the aforementioned first, second and third outline informations. In some embodiments, the infrared sensing module may receive the infrared light that is emitted by the distance measuring module 20-2 and reflected by the object.

In some embodiments, the sensing unit 20-4 may comprise a light measuring module for measuring environmental light. When the illumination of environmental light is lower than a predetermined value, the light measuring module can transmit infrared light to the object, and the infrared sensing module can receive the infrared light that is reflected by the object. Therefore, adverse influence to the 3D model construction can be avoided when the environment is dark.

In some embodiments, the sensing unit 20-4 may comprise a GPS module for capturing location information of the camera module 20-1 and the distance measuring module 20-2 relative to the object. The processing unit 20-3 can establish a 3D model of the object at least based on the location information and the aforementioned first and second outline informations.

In some embodiments, the sensing unit 20-4 may comprise an inertial sensor to obtain posture information of the camera module 20-1 and the distance measuring module 20-2 relative to the object.

In some embodiments, the sensing unit 20-4 may comprise a temperature sensor for sensing the temperature around the 3D object information capturing system 20-10.

In some embodiments, the sensing unit 20-4 may comprise a magnetic field sensor for sensing the magnetic field around the 3D object information capturing system 20-10.

As mentioned above, since the 3D object information capturing system 20-10 can acquire different types of useful information (e.g. location, posture, temperature, or magnetic field), a precise and realistic 3D model of the objects in the surrounding environment can be achieved.

In some embodiments, the camera module 20-1 of the 3D object information capturing system 20-10 may apply the optical systems, and the distance measuring module 20-2 of the 3D object information capturing system 20-10 may apply the light-reflecting or lens mechanism.

In summary, an embodiment of the present disclosure provides an optical driving mechanism, including a movable portion, a bottom plate and a biasing assembly. The movable portion is configured to sustain an optical element having an optical axis. The bottom plate has a moving member, and the movable portion is movably connected to the bottom plate. The biasing assembly has at least one biasing element and the biasing assembly located between the bottom plate and the movable portion for driving the movable portion to move relative to the bottom plate. The bottom plate defines a first electrical connection portion and a second electrical connection portion, and the biasing element is connected to the first and second electrical connection portions. The first electrical connection portion has a fixed body, an insulating layer and a conductive layer, which are sequentially overlapped along the optical axis. The conductive layer is directly and electrically connected to the biasing element. When viewed along the optical axis, the insulating layer protrudes from the fixed body and the conductive layer.

The embodiments in present disclosure have at least one of the advantages or effects that the optical driving mechanism has better focus function and optical compensation, and can protect the biasing assembly, to greatly reduce the damage or breakage caused by the collision during the movement. In some embodiments, the optical driving mechanism further includes a resin assembly and a vibration-damping assembly disposed on and in direct contact with the biasing element to provide a vibration-damping effect, thereby improving the quality of the driving mechanism.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An image processing method, comprising:
   obtaining first information of an object by a camera module, wherein the first information comprises image information;
   obtaining second information of the object by a distance measuring module, wherein the second information comprises distance information, wherein the distance measuring module transmits infrared light and acquires 2D distance matrix information of the object's surface;
   establishing a 3D module model based on the first information and the second information;
   outputting a post-production image according to the 3D model and at least one of the first information or the second information to reduce an adverse influence of environment.

2. The image processing method as claimed in claim 1, further comprising:
   outputting a post-production image according to the 3D model and the first information to reduce the adverse influence of environment on the first information.

3. The image processing method as claimed in claim 2, wherein the post-production image comprises the image information.

4. The image processing method as claimed in claim 1, further comprising:
   outputting a post-production image according to the 3D model and the second information to reduce the adverse influence of environment on the first information.

5. The image processing method as claimed in claim 1, further comprising:
   outputting a post-production image according to the 3D model and the first information to reduce the adverse influence of environment on the second information.

6. An image processing method, comprising:
   obtaining first information of an object by a camera module, wherein the first information comprises image information;
   obtaining second information of the object by a distance measuring module, wherein the second information comprises distance information, wherein the distance measuring module transmits infrared light and acquires 2D distance matrix information of the object's surface;
   establishing a 3D module model based on the first information and the second information;
   outputting a post-production image according to the 3D model and at least one of the first information or the second information to reduce an adverse influence of environment;
   analyzing the first information and generating first outline information of the object according to the first information;
   analyzing the second information and generating second outline information of the object according to the second information;
   providing an infrared sensing module and sensing the object with the infrared sensing module to obtain an infrared information of the object;
   analyzing the infrared information and generating third outline information according to the infrared information; and
   establishing the 3D model of the object according to the first outline information, the second outline information, and the third outline information.

7. The image processing method as claimed in claim 6, further comprising:
   generating the first outline information by performing binarization on the first information.

8. The image processing method as claimed in claim 6, further comprising:

generating the second outline information by calculating the differences between adjacent elements of the second information.

9. The image processing method as claimed in claim 6, further comprising:
transmitting infrared light to the object with the distance-measuring module; and
receiving the infrared light that is reflected by the object using the infrared sensing module.

10. The image processing method as claimed in claim 6, further comprising:
providing a light measuring module to measure environmental light; and
transmitting infrared light to the object with the distance-measuring module when the illumination by environmental light is lower than a predetermined value, and receiving the infrared light that is reflected by the object using the infrared sensing module.

11. The image processing method as claimed in claim 1, further comprising:
capturing a plurality of 2D images of the object from different locations using the camera module, and generating a plurality of first outline informations of the object according to the 2D images;
capturing a plurality of 2D distance matrix informations of the object from different locations using the distance-measuring module, and generating a plurality of second outline informations of the object according to the 2D distance matrix informations; and
establishing the 3D model of the object according to the first outline information and the second outline information.

12. The image processing method as claimed in claim 1, further comprising:
capturing a plurality of 2D images of the object from different angles using the camera module, and generating a plurality of first outline informations of the object according to the 2D images;
capturing a plurality of 2D distance matrix informations of the object from different angles using the distance-measuring module, and generating a plurality of second outline informations of the object according to the 2D distance matrix informations; and
establishing the 3D model of the object according to the first and second outline informations.

13. The image processing method as claimed in claim 1, further comprising:
providing a GPS module and capturing location information of the camera module and the distance measuring module relative to the object; and
establishing the 3D model of the object according to the location information and the first and second outline informations.

14. An image processing method, comprising:
obtaining first information of an object by a camera module, wherein the first information comprises image information;
obtaining second information of the object by a distance measuring module, wherein the second information comprises distance information, wherein the distance measuring module transmits infrared light and acquires 2D distance matrix information of the object's surface;
establishing a 3D module model based on the first information and the second information;
outputting a post-production image according to the 3D model and at least one of the first information or the second information to reduce an adverse influence of environment;
providing an inertial sensor GPS module and capturing posture information of the camera module and the distance measuring module relative to the object.

15. The image processing method as claimed in claim 1, wherein the first information includes color information of the object.

16. An image processing method, comprising:
obtaining first information of an object by a camera module, wherein the first information comprises image information;
obtaining second information of the object by a distance measuring module, wherein the second information comprises distance information, wherein the distance measuring module transmits infrared light and acquires 2D distance matrix information of the object's surface;
establishing a 3D module model based on the first information and the second information;
outputting a post-production image according to the 3D model and at least one of the first information or the second information to reduce an adverse influence of environment;
providing a plurality of 3D object information capturing systems, wherein each of the 3D object information capturing systems comprises the camera module and the distance measuring module; and
detecting the object using the 3D object information capturing systems from different angles at the same time, to establish the 3D model of the object.

17. A 3D object information capturing system, comprising:
a camera module, capturing first information of an object, wherein the first information comprises image information;
a distance measuring module, capturing second information of the object, wherein the second information comprises distance information, wherein the distance measuring module transmits infrared light and acquires 2D distance matrix information of the object's surface;
a processing unit, receiving the first information and the second information respectively from the camera module and the distance measuring module, constructing a 3D model of the object according to the image information and the distance information, and outputting a post-production image according to the 3D model and at least one of the first information or the second information to reduce an adverse influence of environment.

18. The 3D object information capturing system as claimed in claim 17, further comprising an infrared sensing module for sensing the object with infrared light.

19. The 3D object information capturing system as claimed in claim 13, further comprising a light measuring module to measure environmental light.

20. The 3D object information capturing system as claimed in claim 13, further comprising a GPS module to capture location information of the camera module and the distance measuring module relative to the object.

* * * * *